Patented May 17, 1932

1,858,628

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

WATER INSOLUBLE AZODYESTUFFS AND PROCESS OF MAKING SAME

No Drawing. Application filed July 17, 1929, Serial No. 379,060, and in Germany July 25, 1928.

Our invention relates to new azodyestuffs corresponding probably to the general formula:

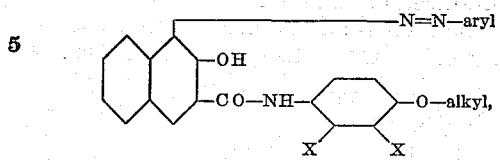

wherein one X means hydrogen and the other X a methyl-group and aryl represents the residue of an aromatic diazotizable aminocompound not containing any groups, such as the sulfonic group or the carboxylic group, which would render the dyestuffs soluble in water or alkalies. Our new compounds are obtainable by combining in substance or on a substratum, particularly on the fiber, any diazo-, tetrazo- or diazoazocompound, not containing any groups, such as the sulfonic group or the carboxylic group, which would render the dyestuffs soluble in water or alkalies, with a 2.3-hydroxynaphthoyl-4-amino-1-alkoxy-methylbenzene of the general formula:

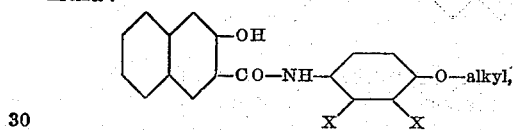

wherein one X means hydrogen and the other X a methylgroup. The new dyestuffs may be used for the production of valuable color lakes; when produced on the fiber they yield fast dyeings and printings. Compared with the known azodyestuffs derived from 2.3-hydroxynaphthoyl-4-amino-1-alkoxybenzene not containing a methyl group in 2 or 3 position the present new dyestuffs are distinguished surprisingly by such an increase of the fastness to light, that already dyestuffs obtained by combination with simple and cheap diazocompounds, such as meta-xylidine, show a remarkable fastness to light. Some of the dyestuffs in this series furthermore show a bright shade and a good fastness to kier boiling.

In order to further illustrate our invention the following examples are given, the parts being by weight and all temperatures in centigrade degrees, but we wish it to be understood that we are not limited to the particular products nor reaction conditions mentioned therein:

Example 1

15,2 parts of 4-nitro-2-toluidine are diazotized in the usual manner and the diazocompound is combined with a solution of 32,2 parts of 2.3-hydroxynaphthoyl-4-amino-3-methyl-1-methoxybenzene in a dilute caustic soda solution containing Turkey red oil and containing an amount of sodium acetate sufficient for binding the excess of the mineral acid. The separated dyestuff corresponding probably to the formula:

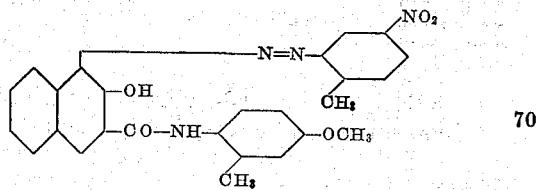

is filtered off and washed. Mixed with the usual substrata it yields red color lakes of a very good fastness to light.

Example 2

Cotton material previously treated in the usual manner is impregnated with a solution containing 9 grs. of 2.3-hydroxynaphthoyl-4-amino-3-methyl-1-methoxybenzene, 18 ccs. of a caustic soda solution of 34° Bé. and 15 ccs. of Turkey red oil in the liter, and developed after having been squeezed off, with a diazosolution containing 1,42 grs. of 5-chloro-2-toluidine in the liter and neutralized with sodium acetate. The material is then worked up as usually.

The dyestuff thus produced on the fiber corresponds probably to the formula:

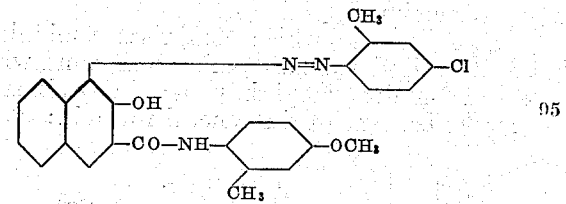

It yields a bright bluish red dyeing of a very good fastness to light.

The following table gives the shades of some other dyestuffs derived from 2.3-hydroxynaphthoyl-4-amino-3-methyl-1-meththoxybenzene:

| Diazocompound of: | Shade obtained: |
|---|---|
| m-xylidine | Bluish red |
| m-chloroaniline | Orange |
| 2.5-dichloroaniline | Brownish orange |
| 2.4-dichloroaniline | Full red |
| 6-chloro-2-toluidine | Yellowish red |
| 4.6-dichloro-3-amino-toluene | Dark red |
| 2-nitroaniline | Claret |
| 3-nitroaniline | Yellowish red |
| 4-chloro-2-nitroaniline | Full bluish claret |
| 4.5-dichloro-2-nitroaniline | idem |
| 3-nitro-4-toluidine | idem |
| 5-nitro-2-toluidine | Claret |
| 4-nitro-2-anisidine | Bluish red |
| 5-nitro-2-anisidine | Dark bluish claret |
| 3-nitro-4-anisidine | Garnet |
| 1-aminoanthraquinone | Brownish red |
| o-aminoazotoluene | Bluish garnet |
| 4-amino-4'-nitro-2.5-dimethoxy-azobenzene | Black |
| dianisidine (subsequently treated with copper) | Dark blue |

Derived from 2.3-hydroxynaphthoyl-4-amino-3-methyl-1-ethoxybenzene:

| Diazocompound of: | Shade obtained: |
|---|---|
| m-chloroaniline | Yellowish brown |
| 2.5-dichloroaniline | Brownish orange |
| 4-chloro-2-toluidine | Scarlet |
| 2.5-dichloro-4-toluidine | Brown |
| 4.6-dichlor-3-toluidine | Bluish red |
| 4-chloro-2-amino-diphenylether | Scarlet |
| 2.4.5-trichloroaniline | Brown |
| 2-nitroaniline | Orange-brown |
| 4-chloro-5-bromo-2-toluidine | Full red |
| 5-nitro-2-toluidine | Full bluish red |
| 1-aminoanthraquinone | Brownish red |

Derived from 2.3-hydroxynaphthoyl-4-amino-3-methyl-phenyl-n-butylether:

| Diazocompound of: | Shade obtained: |
|---|---|
| 5-chloro-2-toluidine | Red |
| 2.5-dichloroaniline | Brownish orange |
| 2.4.5-trichloroaniline | Full red |
| 2-nitroaniline | Brownish red |
| 5-nitro-2-anisidine | Bluish claret |
| 1-aminoanthraquinone | Brownish red |

Since an object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid, the carboxylic acid and the hydroxy group.

We claim:

1. A process which comprises combining a diazotized aromatic amino compound with a 2.3-hydroxynaphthoyl-4-amino-1-alkoxy-methylbenzene of the general formula:

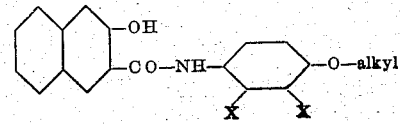

wherein one X means hydrogen and the other X a methylgroup.

2. As new compounds azodyestuffs corresponding probably to the general formula.

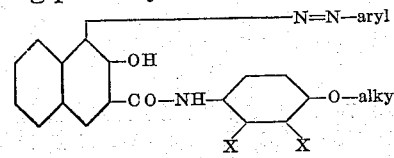

wherein one X means hydrogen and the other X a methylgroup and aryl represents the residue of an aromatic diazotizable aminocompound, which dyestuffs yield when mixed with the usual substrata valuable orange to red to blue to black color lakes and orange to red to blue to black dyeings fast to light when produced on the fiber.

3. As new compounds azodyestuffs corresponding probably to the general formula:

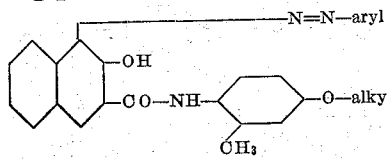

wherein aryl represents the residue of an aromatic diazotizable aminocompound, which dyestuffs yield when mixed with the usual substrata valuable orange to red to blue to black color lakes and orange to red to blue to black dyeings fast to light when produced on the fiber.

4. As new compounds azodyestuffs corresponding probably to the general formula:

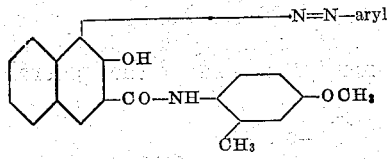

wherein aryl represents the residue of an aromatic diazotizable aminocompound, which dyestuffs yield when mixed with the usual substrata valuable orange to red to blue to black color lakes and orange to red to blue to black dyeings fast to light when produced on the fiber.

5. As new compounds azodyestuffs corresponding probably to the general formula:

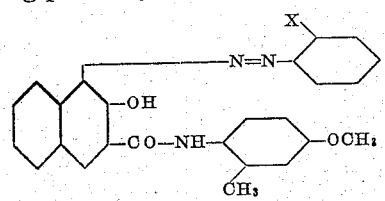

wherein X means an alkyl, alkoxy, aryloxy or nitro group or a halogen atom and this benzene nucleus may contain a further substituent of the group consisting of alkyl, alkoxy, aryloxy, nitro or halogen, which dyestuffs yield when mixed with the usual substrata valuable orange to red to blue to black color lakes and orange to red to blue to black dyeings fast to light when produced on the fiber.

6. As new compounds azodyestuffs corresponding probably to the general formula:

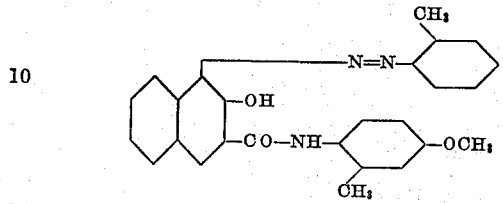

wherein the benzene nucleus attached to the azogroup may contain a further substituent of the group consisting of alkyl, alkoxy, aryloxy, nitro or halogen, which dyestuffs yield when mixed with the usual substrata valuable orange to red to blue to black color lakes and orange to red to blue to black dyeings fast to light when produced on the fiber.

7. As new compounds azodyestuffs corresponding probably to the general formula:

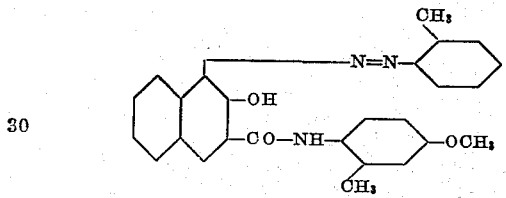

wherein the benzene nucleus attached to the azogroup contains a further methylgroup or chlorine, which dyestuffs yield bright bluish red dyeings of a good fastness to light.

8. As a new compound the azodyestuffs corresponding probably to the formula:

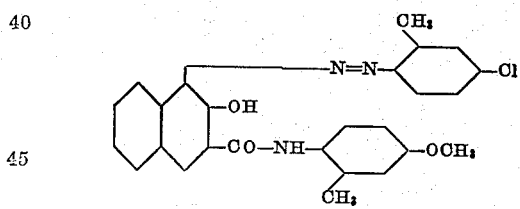

which dyestuff yields bright bluish red dyeings of a good fastness to light.

In testimony whereof, we affix our signatures.

LEOPOLD LASKA.
ARTHUR ZITSCHER.